(12) United States Patent
Schramm

(10) Patent No.: US 11,385,039 B2
(45) Date of Patent: Jul. 12, 2022

(54) METHODS OF MEASURING A SIZE OF EDGE DEFECTS OF GLASS SHEETS USING AN EDGE DEFECT GAUGE AND CORRESPONDING EDGE DEFECT GAUGE

(71) Applicant: CORNING INCORPORATED, Corning, NY (US)

(72) Inventor: John David Schramm, Endicott, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/275,962

(22) PCT Filed: Sep. 6, 2019

(86) PCT No.: PCT/US2019/049874
§ 371 (c)(1),
(2) Date: Mar. 12, 2021

(87) PCT Pub. No.: WO2020/060772
PCT Pub. Date: Mar. 26, 2020

(65) Prior Publication Data
US 2022/0057185 A1    Feb. 24, 2022

Related U.S. Application Data

(60) Provisional application No. 62/733,228, filed on Sep. 19, 2018.

(51) Int. Cl.
*G01B 3/30* (2006.01)
*C03B 33/033* (2006.01)

(52) U.S. Cl.
CPC .............. *G01B 3/30* (2013.01); *C03B 33/033* (2013.01)

(58) Field of Classification Search
CPC ................................ G01B 3/30; C03B 33/033
See application file for complete search history.

(56) References Cited

U.S. PATENT DOCUMENTS 4,226,538 A * 10/1980 Van Beeck ........ G01N 21/8903
250/559.46
4,492,477 A * 1/1985 Leser ................... G01N 21/958
356/239.8

(Continued)

FOREIGN PATENT DOCUMENTS

CN          1619299 A      5/2005
CN        203688460 U      7/2014
(Continued)

OTHER PUBLICATIONS

International Search Report and Written Opinion of the International Searching Authority; PCT/US19/049874; dated Dec. 20, 2019; 10 Pages; European Property Office.

*Primary Examiner* — Yaritza Guadalupe-McCall
(74) *Attorney, Agent, or Firm* — Jeffrey A. Schmidt

(57) ABSTRACT

An edge defect gauge that measures a size of edge defects of glass sheets, the edge defect gauge comprising: a body including opposite end edges and opposite side edges that extend between the end edges forming a body, the body having opposite flat faces; and at least one of (i) a dog ear measuring projection extending outward from one of the end edges at one of the side edges, the dog ear measuring projection having a predetermined height and a predetermined length or (ii) a cantilever measuring recess extending inward from the other end edge at the one of the side edges, the cantilever measuring recess having a predetermined height and a predetermined length.

20 Claims, 7 Drawing Sheets

(56) References Cited

U.S. PATENT DOCUMENTS

| | | | | |
|---|---|---|---|---|
| 5,311,276 A * | 5/1994 | Masao | ................. | G01N 21/896 |
| | | | | 356/445 |
| 6,930,772 B2 * | 8/2005 | Maezono | ............. | G01N 21/896 |
| | | | | 356/429 |
| 2008/0204741 A1 * | 8/2008 | Hill | .................... | G01B 11/2441 |
| | | | | 356/239.7 |
| 2020/0408698 A1 * | 12/2020 | Han | ....................... | G01N 21/89 |
| 2021/0304396 A1 * | 9/2021 | Addington | ......... | G01N 21/6456 |

FOREIGN PATENT DOCUMENTS

| | | | | |
|---|---|---|---|---|
| DE | 2916864 A1 | 11/1980 | | |
| JP | 09-327342 A | 12/1997 | | |
| JP | 2004-128822 A | 4/2004 | | |
| WO | WO-2020060772 A1 * | 3/2020 | ............... | G01B 3/30 |

\* cited by examiner

METHODS OF MEASURING A SIZE OF EDGE DEFECTS OF GLASS SHEETS USING AN EDGE DEFECT GAUGE AND CORRESPONDING EDGE DEFECT GAUGE

CROSS-REFERENCE TO RELATED APPLICATIONS

This application is a national stage entry of International Patent Application Serial No. PCT/US2019/049874, filed on Sep. 6, 2019, which in turn, claims the benefit of priority under 35 U.S.C. § 119 of U.S. Provisional Application Ser. No. 62/733,228 filed on Sep. 19, 2018, the contents of each of which are relied upon and incorporated herein by reference in their entireties.

TECHNICAL FIELD

The present disclosure relates to methods and devices for measuring defects in separated glass and, in particular, handheld gauge devices for measuring edge defects in separated glass.

BACKGROUND

Thin glass sheets have found use in many optical, electronic or optoeletronic devices, such as liquid crystal displays (LCD), organic light-emitting diode (OLED) displays, solar cells, as semiconductor device substrates, color filter substrates, cover sheets, and the like. The thin glass sheets, having a thickness from several micrometers to several millimeters, may be fabricated by a number of methods, such as float process, fusion down-draw process (a method pioneered by Corning Incorporated, Corning, N.Y., U.S.A.), slot down-draw process, and the like.

In many of the applications of thin glass sheets, it is highly desired that the glass sheets have pristine surface quality essentially free of scratches, particles, and other defects, high thickness uniformity and low surface roughness and waviness. To that end, in the forming process for making the glass sheets, typically direct contact of the center region of major surfaces of the as-formed glass sheet with solid surfaces is avoided. Instead, only the peripheral region of the glass sheet may be subjected to direct contact with solid surfaces such as edge rolls, pulling rolls, edge guiding rolls, and the like. Thus, the peripheral portions of both sides of an as-formed glass sheet obtained directly from the forming device, such as in the bottom-of-draw area of a fusion down-draw or slot down-draw process, sometimes called edge beads, tend to have lower surface quality than the center region of the major surfaces. In addition, depending on the specific forming device used, the peripheral portions tend to have different thickness and significantly higher thickness variation than the center quality region.

Various edge bead removal technologies are used with different yield, yield consistency, and cost of the processes and equipment. Often, the edge bead removal technologies are used in a controlled environment and utilized automated apparatuses. Sheet edge strip separation devices are available for separating glass sheet edge strips from quality portions of the glass sheets in downstream edge strip removal processes. Use of these edge strip separation devices can produce edge chips and other edge defects. However, these edge defects, in some instances, may not lead to a need to scrap the entire glass sheet. What is needed is a gauge that can be used to quickly measure edge defect size to determine whether or not to use the glass sheet.

SUMMARY

The present disclosure involves using an edge defect gauge to measure edge defects of glass sheets where edge strips have been removed. The separation of the edge strips of the glass sheet may be performed using handheld sheet edge strip separation devices. The edge strip separation devices may be used to separate relatively long and narrow edge strips from wider glass sheets, which can require added force over a smaller area compared to wider and shorter edge strips. The edge defect gauge is used to reduce thickness variability in the glass sheets for stacking in downstream thermal processes. Due to the edge separation requiring a larger than typical force over a small area and thin, long edge strips being separated, yield losses can arise from defects at ends of the separated edge strip. The defects can be present as cantilever chips and/or "dog ear" defects. Both types of defects can lead to warpage during a ceramming process of a stack of glass sheets if any of the glass sheets in the stack have defects of unacceptable dimensions.

According to a first aspect, a method of measuring a size of edge defects of glass sheets using an edge defect gauge, the method comprising: placing a glass sheet that includes a dog ear defect on the edge defect gauge, the edge defect gauge comprising: a body including opposite end edges and opposite side edges that extend between the end edges forming a body, the body having opposite flat faces; and a dog ear measuring projection extending outward from one of the end edges at one of the side edges, the dog ear measuring projection having a predetermined height and a predetermined length; aligning an edge of the glass sheet with one of the side edges of the body, the dog ear defect coextending with the edge of the glass sheet; aligning an adjacent edge of the glass sheet with the one of the end edges such that the dog ear extends over the dog ear measuring projection; and determining if at least one of a height and length dimension of the dog ear defect is (i) greater than or (ii) less than or equal to at least one of the predetermined height and predetermined length of the dog ear measuring projection.

In another aspect, an edge defect gauge that measures a size of edge defects of glass sheets, the edge defect gauge comprising: a body including opposite end edges and opposite side edges that extend between the end edges forming a body, the body having opposite flat faces; and at least one of (i) a dog ear measuring projection extending outward from one of the end edges at one of the side edges, the dog ear measuring projection having a predetermined height and a predetermined length or (ii) a cantilever measuring recess extending inward from the other end edge at the one of the side edges, the cantilever measuring recess having a predetermined height and a predetermined length.

In another aspect, a method of measuring a size of edge defects of glass sheets using an edge defect gauge, the method comprising: placing a glass sheet that includes a cantilever chip on a support surface; placing the edge defect gauge on the glass sheet, the edge defect gauge comprising: a body including opposite end edges and opposite side edges that extend between the end edges forming a body, the body having opposite flat faces where one of the faces of the body facing the glass sheet; and a cantilever measuring recess extending inward from one of the end edges at one of the side edges, the cantilever measuring recess having a predetermined height and a predetermined length; aligning an edge of the glass sheet with the one of the side edges of the body, the cantilever chip located at the edge of the glass sheet; aligning an adjacent edge of the glass sheet with the one of the end edges; and determining if the glass sheet is visible within the cantilever measuring recess.

Additional features and advantages will be set forth in the detailed description which follows, and in part will be readily apparent to those skilled in the art from the description or recognized by practicing the disclosure as exemplified in the written description and the appended drawings and as defined in the appended claims. It is to be understood that both the foregoing general description and the following detailed description are merely exemplary of the disclosure, and are intended to provide an overview or framework to understanding the nature and character of the disclosure. For example, the various features of the disclosure may be combined according to the following embodiments.

Embodiment 1. A method of measuring a size of edge defects of glass sheets using an edge defect gauge, the method comprising:

placing a glass sheet that includes a dog ear defect on the edge defect gauge, the edge defect gauge comprising:
a body including opposite end edges and opposite side edges that extend between the end edges forming a body, the body having opposite flat faces; and
a dog ear measuring projection extending outward from one of the end edges at one of the side edges, the dog ear measuring projection having a predetermined height and a predetermined length;

aligning an edge of the glass sheet with one of the side edges of the body, the dog ear defect coextending with the edge of the glass sheet;

aligning an adjacent edge of the glass sheet with the one of the end edges such that the dog ear extends over the dog ear measuring projection; and determining if at least one of a height and length dimension of the dog ear defect is (i) greater than or (ii) less than or equal to at least one of the predetermined height and predetermined length of the dog ear measuring projection.

Embodiment 2. The method of Embodiment 1, wherein the edge defect gauge further comprises a glass edge alignment feature having a guide surface that extends outward from one of the faces of the body, the method further comprising aligning the edge of the glass sheet with the guide surface.

Embodiment 3. The method of Embodiment 2, wherein the step of placing the glass sheet comprises placing the glass sheet on the one of the faces of the body from which the guide surface extends.

Embodiment 4. The method of any one of Embodiments 1-3 further comprising identifying the glass sheet as scrap if at least one of the height and length dimensions of the dog ear defect is greater than at least one of the predetermined height and length dimensions of the dog ear measuring projection.

Embodiment 5. The method of any one of Embodiments 1-4, wherein the predetermined height and the predetermined length are a same dimension.

Embodiment 6. The method of any one of Embodiments 1-5 further comprising:

placing a glass sheet that includes a cantilever chip on a support surface, wherein the glass sheet that includes a cantilever chip is the same as the glass sheet that includes a dog ear defect of a different glass sheet;

placing the edge defect gauge on the glass sheet with the cantilever chip with one of the faces of the body facing the glass sheet, the edge defect gauge comprising:

a cantilever measuring recess extending inward from the other end edge at the one of the side edges, the cantilever measuring recess having a predetermined height and a predetermined length;

aligning an edge of the glass sheet with the cantilever chip with the one of the side edges of the body, the cantilever chip located at the edge of the glass sheet;

aligning an adjacent edge of the glass sheet with the other end edge; and determining if the glass sheet with the cantilever chip is visible within the cantilever measuring recess.

Embodiment 7. The method of Embodiment 6, wherein the edge defect gauge further comprises a glass edge alignment feature having a guide surface that extends outward from the one of the faces of the body, the method further comprising aligning the edge of the glass sheet with the cantilever chip with the guide surface.

Embodiment 8. The method of Embodiment 6 or Embodiment 7 further comprising identifying the another glass sheet as scrap if the glass sheet is not visible within the cantilever measuring recess.

Embodiment 9. The method of any one of Embodiments 6-8, wherein the predetermined height and the predetermined length of the cantilever measuring recess are a same dimension.

Embodiment 10. An edge defect gauge that measures a size of edge defects of glass sheets, the edge defect gauge comprising:

a body including opposite end edges and opposite side edges that extend between the end edges forming a body, the body having opposite flat faces; and at least one of (i) a dog ear measuring projection extending outward from one of the end edges at one of the side edges, the dog ear measuring projection having a predetermined height and a predetermined length or (ii) a cantilever measuring recess extending inward from the other end edge at the one of the side edges, the cantilever measuring recess having a predetermined height and a predetermined length.

Embodiment 11. The edge defect gauge of Embodiment 10 further comprising a glass edge alignment feature having a guide surface that extends outward from one of the faces of the body.

Embodiment 12. The edge defect gauge of Embodiment 11 formed from a single piece of material.

Embodiment 13. The edge defect gauge of any one of Embodiments 10-12, wherein the predetermined height and the predetermined length are a same dimension.

Embodiment 14. The edge defect gauge of any one of Embodiments 10-13, wherein the edge defect gauge includes the dog ear measuring projection and the cantilever measuring recess.

Embodiment 15. The edge defect gauge of any one of Embodiments 1-14, wherein the predetermined height and the predetermined length of the cantilever measuring recess are a same dimension.

Embodiment 16. A method of measuring a size of edge defects of glass sheets using an edge defect gauge, the method comprising:

placing a glass sheet that includes a cantilever chip on a support surface;

placing the edge defect gauge on the glass sheet, the edge defect gauge comprising:

a body including opposite end edges and opposite side edges that extend between the end edges forming a body, the body having opposite flat faces where one of the faces of the body facing the glass sheet; and a cantilever measuring recess extending inward from one of the end edges at one of the side edges, the cantilever measuring recess having a predetermined height and a predetermined length;

aligning an edge of the glass sheet with the one of the side edges of the body, the cantilever chip located at the edge of the glass sheet;

aligning an adjacent edge of the glass sheet with the one of the end edges; and determining if the glass sheet is visible within the cantilever measuring recess.

Embodiment 17. The method of Embodiment 16, wherein the edge defect gauge further comprises a glass edge alignment feature having a guide surface that extends outward from the one of the faces of the body, the method further comprising aligning the edge of the glass sheet with the guide surface.

Embodiment 18. The method of Embodiment 16 or Embodiment 17 further comprising identifying the glass sheet as scrap if the glass sheet is not visible within the cantilever measuring recess.

Embodiment 19. The method of any one of Embodiments 16-18, wherein the predetermined height and the predetermined length of the cantilever measuring recess are a same dimension.

Embodiment 20. The method of any one of Embodiments 16-20, wherein the edge defect gauge further comprises a dog ear measuring projection extending outward from the other end edge at the one of the side edges, the dog ear measuring projection having a predetermined height and a predetermined length The accompanying drawings are included to provide a further understanding of principles of the disclosure, and are incorporated in and constitute a part of this specification. The drawings illustrate one or more embodiment(s), and together with the description serve to explain, by way of example, principles and operation of the disclosure. It is to be understood that various features of the disclosure disclosed in this specification and in the drawings can be used in any and all combinations.

DETAILED DESCRIPTION

Figure 1:
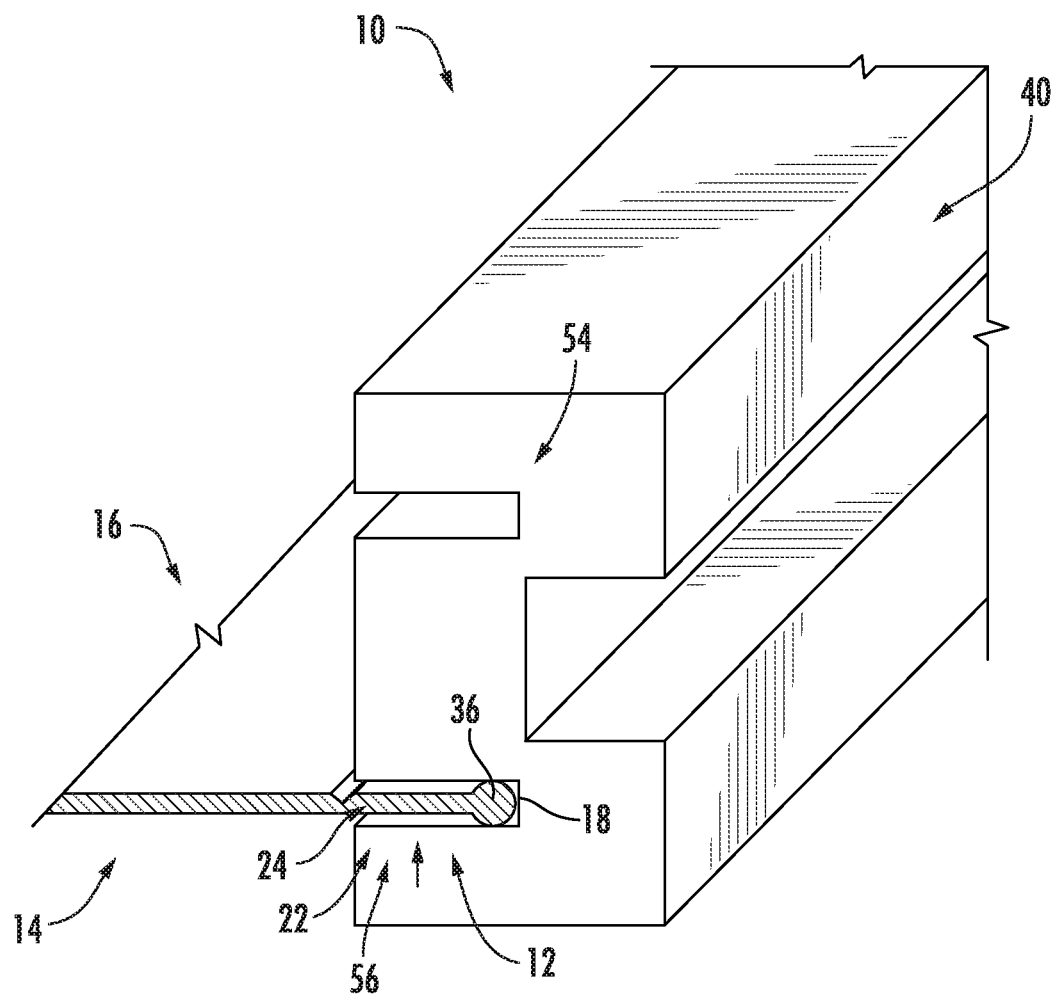
FIG. 1 is a perspective end view of a handheld sheet edge strip separation device in use, according to one or more embodiments shown and described herein.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

Glass edge strip separation from glass sheets can be (i) performed by hand requiring pressure to be applied as well as rotation of the wrist, (ii) performed using an automated process, or (iii) performed using glass sheets a smaller, handheld sheet edge strip separation device.

Referring to FIG. 1, a handheld sheet edge strip separation device 10 is illustrated in an edge strip separation process where an edge strip 12 is in the process of being separated from a central quality portion 14 of a glass sheet 16. As used herein, the term "edge strip" refers to a portion of the glass sheet 16 that includes an edge 18 to be or already removed. The sheet edge strip separation device 10 has a separation body 40 having at least one edge receiving channel 22 that is sized to slidingly receive an edge portion 24 of the glass sheet 16.

Figure 2:
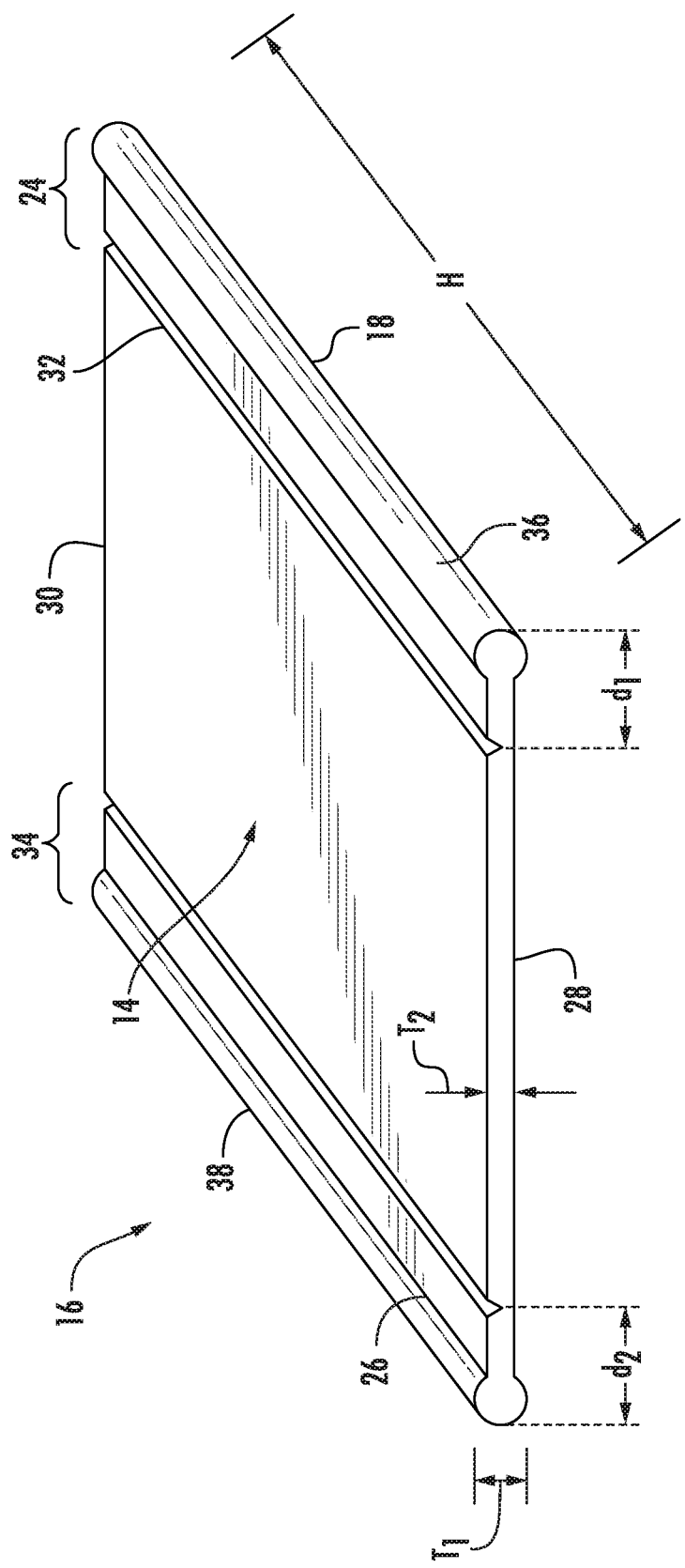
FIG. 2 is a perspective end view of a glass sheet, according to one or more embodiment shown and described herein.

In some embodiments, such as the one shown, the edge portion 24 includes an edge bead 36. Referring briefly to FIG. 2, the glass sheet 16 has a first pair of opposite edges 18, 26 and second pair of opposite edges 28 and 30, forming a rectangular shape. While a rectangular shape is illustrated, other, non-rectangular shapes may be provided. The first edge portion 24 is provided that includes the edge 18 and extends in a widthwise direction a distance $d_1$ to a score line 32 that extends along a height H of the glass sheet 16. The score line 32 is a line of weakness that may be formed using any suitable method, such as by mechanical scoring, for example, using a carbide or diamond wheel or by energy, such as using a laser. A second edge portion 34 is provided that includes the edge 26 and extends in the widthwise direction a distance $d_2$ to another score line 32 that extends along the height H of the glass sheet 16. The distances $d_1$ and $d_2$ may be the same or they may be different.

In some embodiments, due to the down draw fusion process of forming the glass sheets, the edge portions 24 and 34 of the glass sheet 16 may have corresponding edge beads 36 and 38 with a thickness $T_1$ that is greater than a thickness $T_2$ of the quality portion 14 that is located between the edge portions 24 and 34. In some embodiments, the thickness $T_2$ may be about 0.7 mm or more, such as about 1 mm or more, such as about 1.5 mm or more, such as about 2 mm or more, such as about 2.5 mm or more, such as about 3 mm or more, such as between about 0.7 mm and about 3 mm, such as between about 1 mm and 2.3 mm, such as about 1.8 mm, such as about 1.3 mm. In addition or alternatively to what is shown, the edge beads may have a non-circular cross-section, such as elliptical, oblong, rectangular or other shapes with convex or other features.

Figure 3:
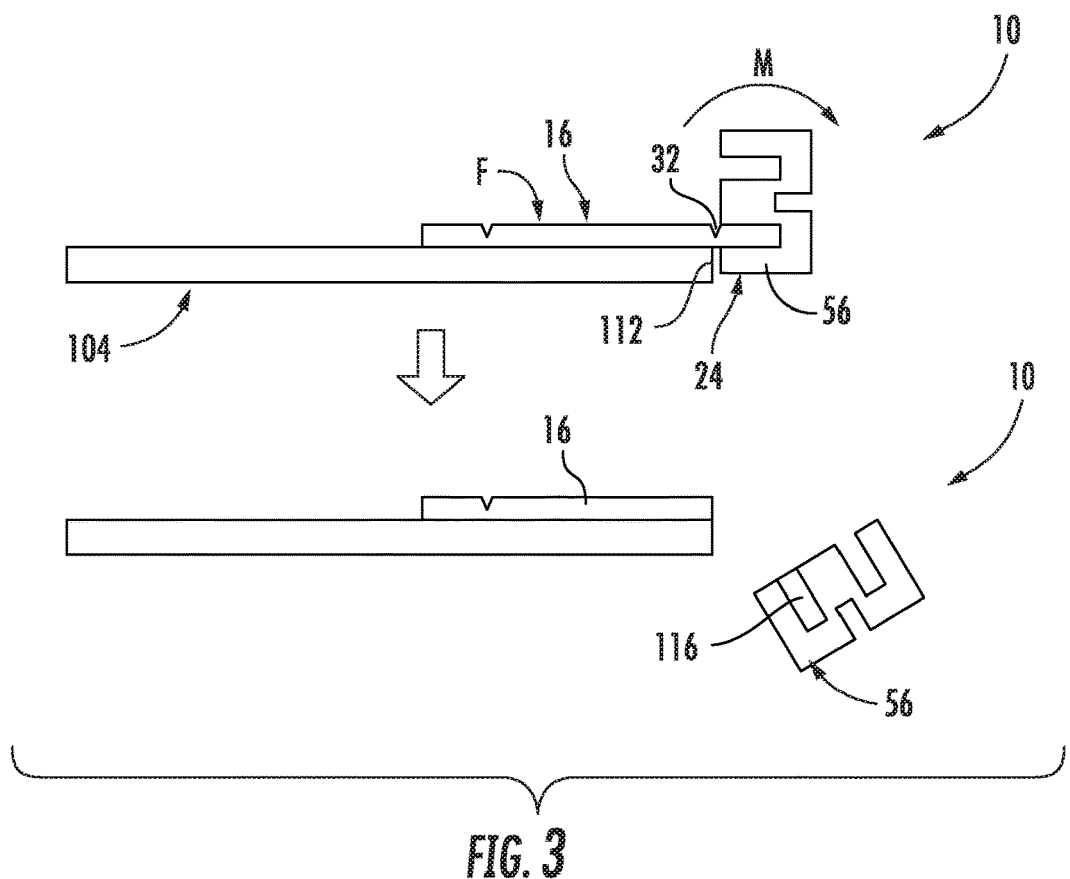
FIG. 3 illustrates a method of using the handheld sheet edge strip separation device of FIG. 1, according to one or more embodiments shown and described herein.
Figure 4:
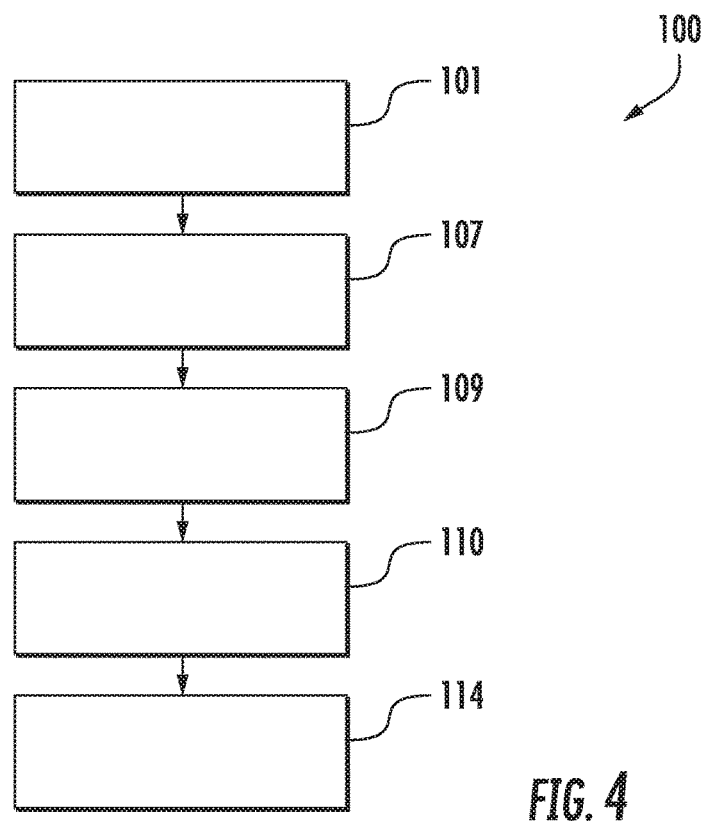
FIG. 4 illustrates the method of FIG. 3, according to one or more embodiments shown and described herein.

FIG. 3 illustrates the sheet edge strip separation device 10 in use and FIG. 4 illustrates a corresponding method 100 of use. At step 101, the glass sheet 16 is placed on a support surface, such as table 105 such that first edge portion 24 extends beyond an edge 112 of the table 104. A clamping force F is applied to the glass sheet 16 at a location separated from first edge portion 24 using, for example, a hand or clamping device at step 107. At step 109, one of first and second edge receiving channels 54 and 56 is slid over the first edge portion 24. In some embodiments, it may be desired to orient the sheet edge strip separation device 10 such that the other of the first and edge receiving channels is located above the glass sheet 16 for additional leverage. Which of the first and second glass edge channels 54 and 56 that is used may depend on the thickness of the glass sheet 16. At step 110, a rotating force M is applied to the sheet edge strip separation device 10 which causes a crack to propagate through the thickness of the glass sheet 16 and along the score line 32. At step 114, a glass edge strip 116 is removed from the quality portion 14 of the glass sheet 16. The process may be repeated for the second edge portion 34.

The above-described sheet edge strip separation device 10 may be used with a number of brittle sheet formed materials, such as glass and glass-ceramics. Glass and glass-ceramic articles can be engineered through chemical strengthening, such as through ion exchange, to design or control the properties of the strengthened article.

As used herein, the term "glass-ceramic" are solids prepared by controlled crystallization of a precursor glass and have one or more crystalline phases and a residual glass phase.

Figure 5:
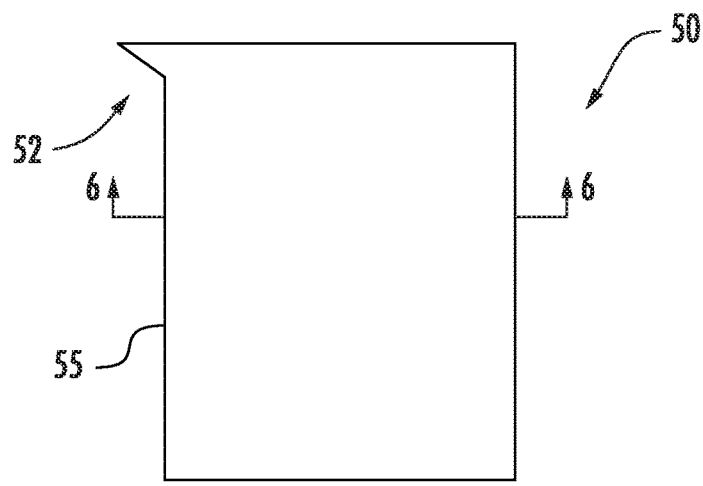
FIG. 5 is a plan view of a glass sheet having a dog ear defect, according to one or more embodiments shown and described herein.
Figure 6:
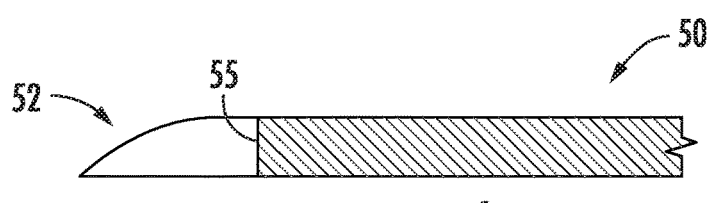
FIG. 6 is a section view of the glass sheet at line 6-6 of FIG. 5.

Referring to FIGS. 5 and 6, as one example, a "dog ear" defect 52 is a projection of glass from an edge 55 of a separated glass sheet 50 that is left after the edge separation process. The dog ear defect 52 projects outwardly from the separated edge 55 of the glass sheet 50. Referring to FIG. 6, the dog ear defect 52 may be of only a partial thickness of the glass sheet 50 as the dog ear defect 52 remains connected to the glass sheet 50 after separating edge strip. In other embodiments, the dog ear defect 52 may be the same thickness as the glass sheet 50 or be of different thicknesses.

Figure 7:
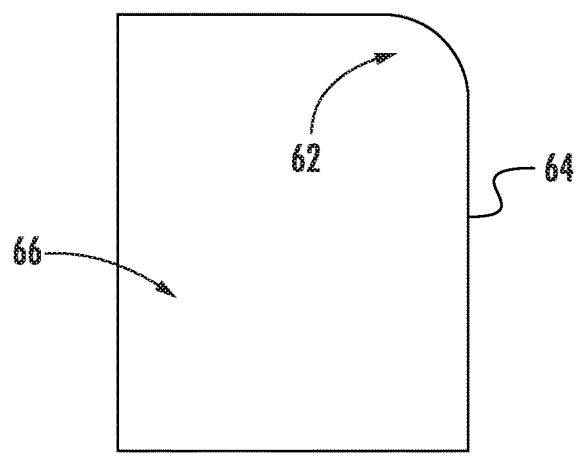
FIG. 7 is a plan view of another glass sheet having a cantilever chip, according to one or more embodiments shown and described herein.
Figure 8:
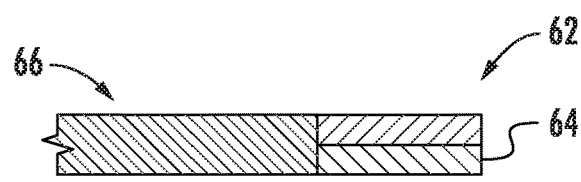
FIG. 8 is a side view of the glass sheet of FIG. 7.

Referring to FIGS. 7 and 8, as another example, a cantilever chip 62 is a recess into the separated edge 64 of a separated glass sheet 60 that is left after the edge separation process. The cantilever chip 62 extends inwardly from the separated edge 64 into a body 66 of the glass sheet 60. Referring to FIG. 8, the cantilever chip 62 may be of only partial thickness of the glass sheet 60 as the cantilever chip 62 extends inwardly into the body 66 after separating the edge strip. In some embodiments, the cantilever chip 62 may be the same thickness as the glass sheet 60 or be of different thicknesses.

Figure 9:
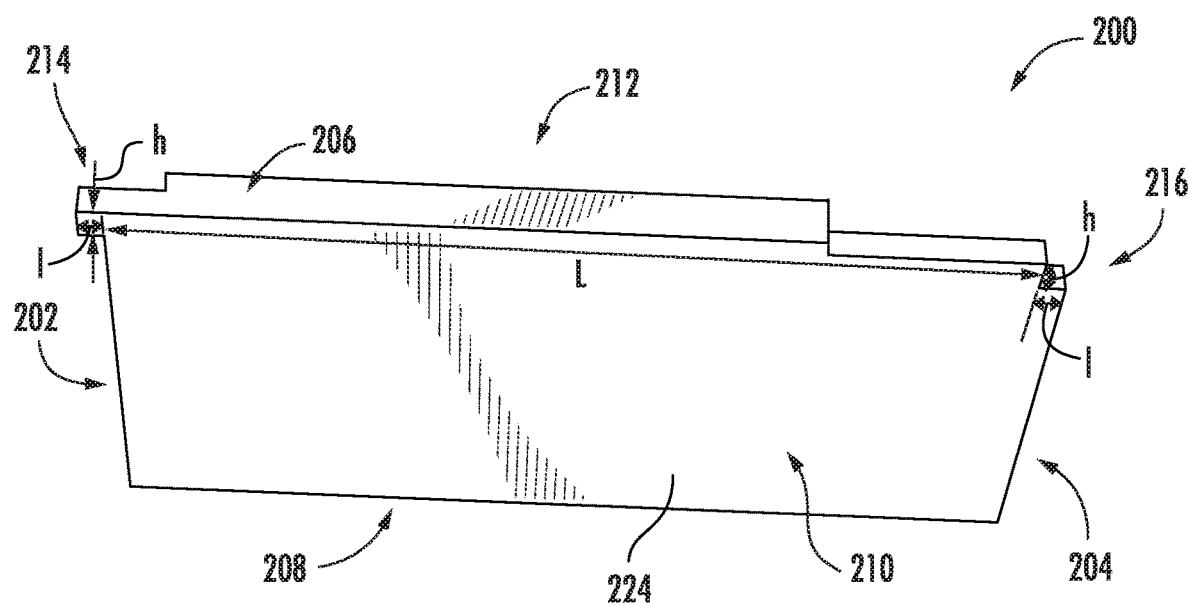
FIG. 9 is a perspective view of an edge defect gauge including a cantilever measuring recess and a dog ear measuring projection, according to one or more embodiments shown and described herein.

Referring now to FIG. 9, an edge defect gauge 200 is used to quickly determine size of the defects, such as the dog ear defect 52 and the cantilever chip 62 in a "go-no go" type fashion thereby determining whether to use or scrap a particular glass sheet after the edge separation process. The edge defect gauge 200 includes opposite end edges 202 and 204 and opposite side edges 206 and 208 that extend between the opposite end edges 202 and 204. In the illustrated example, the opposite end edges 202 and 204 are substantially parallel to each other and the opposite side edges 206 and 208 are substantially parallel to each other forming a rectangular body 210 that is substantially planar having opposite flat faces. The edge defect guide may be formed of any suitable material, such as metal, plastic, wood, paper, foam, rubber, etc. and may be formed as a monolithic device from a single piece of material.

A glass edge alignment feature 212 extends outward from the side edge 206 in a depth direction of the body 210. The glass edge alignment feature 212 also extends along a length of the side edge 206 that may be only a partial length L of the side edge 206, such as less than 80 percent of the length of the side edge 206, such as less than 70 percent of the length of the side edge 206, such as between 20 percent and 80 percent of the length of the side edge 206. As will be described in greater detail, the glass edge alignment feature 212 extends outward from the side edge 206 in the depth direction to provide a guide surface against which an edge of a glass sheet can be positioned in a reliable fashion for a defect measuring process.

In order to measure the size of the defects in the x-y plane or plane of a glass sheet, the edge defect gauge 200 includes a dog ear measuring projection 214 and a cantilever measuring recess 216. The dog ear measuring projection 214 is located at the side edge 206 and extends outward from the end edge 202 in a length direction of the side edge 206. The dog ear measuring projection 214 has a predetermined height h (e.g., of 1 mm, 2 mm, 3 mm, 4 mm, 5 mm or more) and a predetermined length l (e.g., of 1 mm, 2 mm, 3 mm, 4 mm, 5 mm or more). The predetermined height h and predetermined length l may be the same (forming a square shape with right angle corners) or different, depending on the particular downstream process constraints. Further, the predetermined height h and predetermined length l may be selected based, at least in part, on a size of the glass sheet being measured.

The cantilever measuring recess 216 is located at the side edge 206 and extends inward from the end edge 204 in a length direction of the side edge 206. The cantilever measuring recess 216 has a predetermined height h (e.g., of 1 mm, 2 mm, 3 mm, 4 mm, 5 mm or more) and a predetermined length l (e.g., of 1 mm, 2 mm, 3 mm, 4 mm, 5 mm or more). The predetermined height h and predetermined length l may be the same (forming a square shape with a right angle corner) or different, depending on the particular downstream process constraints. Further, the predetermined height h and predetermined length l may be selected based, at least in part, on a size of the glass sheet being measured.

Figure 10:
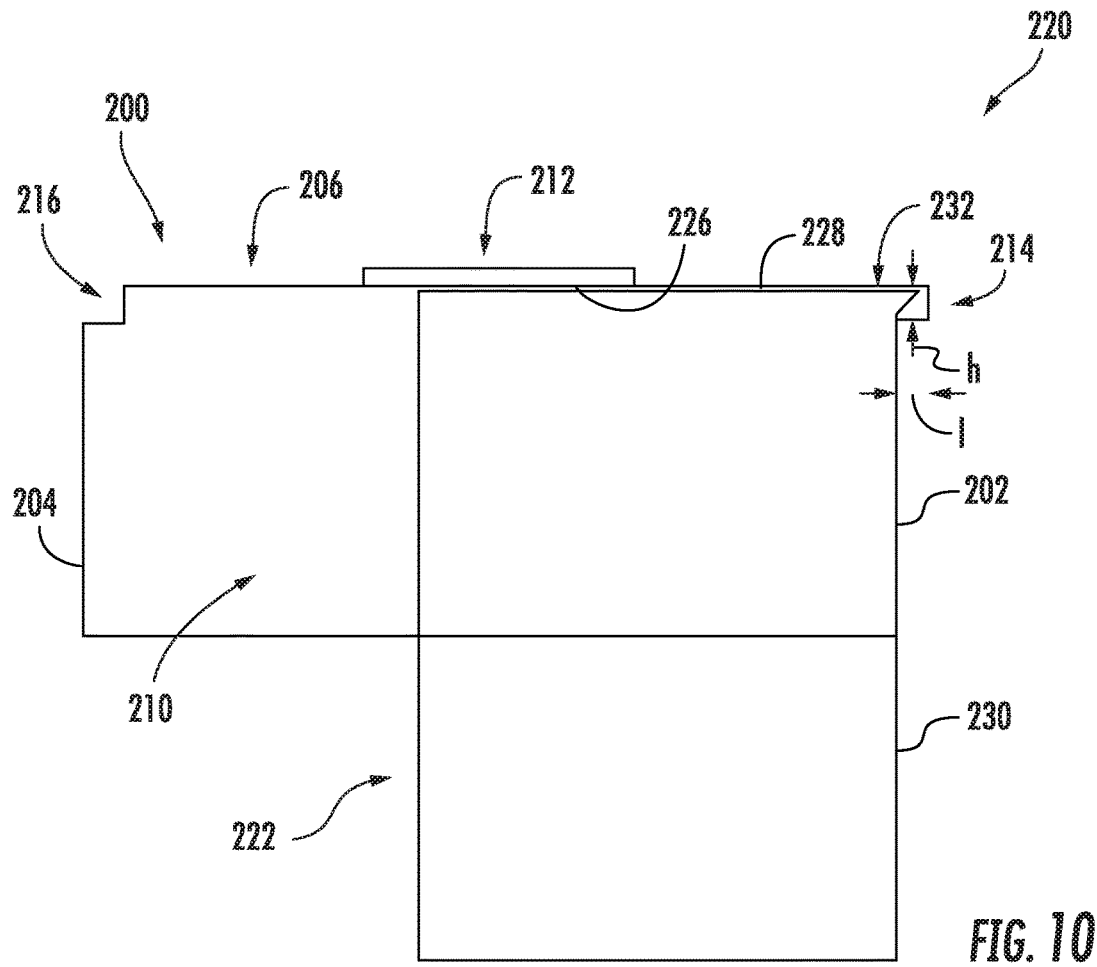
FIG. 10 illustrates a method of using the edge defect gauge of FIG. 9, according to one or more embodiments shown and described herein.

FIG. 10 illustrates a method 220 of measuring edge defects that includes placing a glass sheet 222 on the body 210 with the edge defect gauge 200 lying flat on a face 224 (FIG. 9) such that the glass edge alignment feature 212 extends outward away from a support surface on which the edge defect gauge 200 rests. As described above, the glass edge alignment feature 212 extends outward from the side edge 206 to provide the guide surface 226 against which an edge 228 of the glass sheet 222 can rest. The guide surface 226 is offset from the side edge 206 in the height direction of the body 210 so to align the edge 228 of the glass sheet 222 with the side edge 206.

Figure 11:
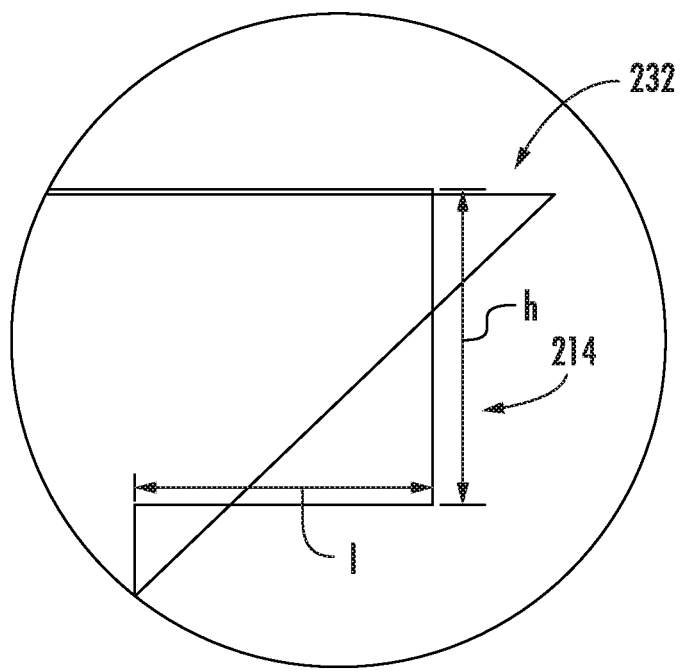
FIG. 11 illustrates another method of using the edge defect gauge of FIG. 9, according to one or more embodiments shown and described herein.

A separated edge 230 of the glass sheet 222 having a dog ear defect 232 extending outward therefrom is aligned with the end edge 202 of the edge defect gauge 200. The dog ear defect 232 extends outward from the separated edge 230 and over the dog ear measuring projection 214. In this example, the dog ear measuring projection 214 is of less dimensions than the dog ear measuring projection 214 in both the height h and length l dimensions. Thus, the glass sheet 222 is a "go" and can continue to be used in a downstream process. FIG. 11 illustrates an example where the dog ear defect 232 is greater in at least one of the height h and length l dimensions. Thus, glass sheet 240 is a "no go" and is thrown out (e.g., recycled) as waste.

Figure 12:
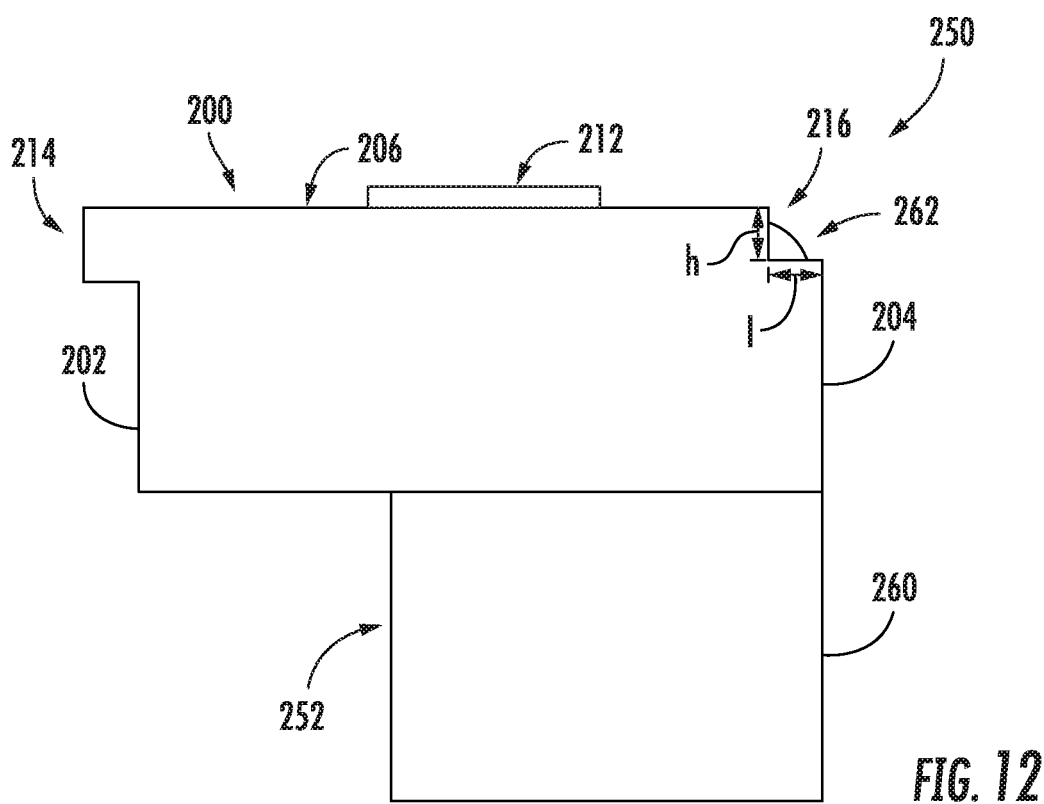
FIG. 12 illustrates another method of using the edge defect gauge of FIG. 9, according to one or more embodiments shown and described herein.

FIG. 12 illustrates another method 250 of measuring edge defects that includes placing the edge defect gauge 200 on a glass sheet 252 with the glass sheet 252 lying flat on a support surface such that the glass edge alignment feature 212 extends outward toward the support surface on which the glass sheet 252 rests. The glass edge alignment feature 212 extends outward from the side edge 206 to provide the guide surface 226 against which an edge 258 of the glass sheet 252 can rest. The guide surface 226 is offset from the side edge 206 in the height direction of the body 210 so to align the edge 258 of the glass sheet 252 with the side edge 206.

Figure 13:
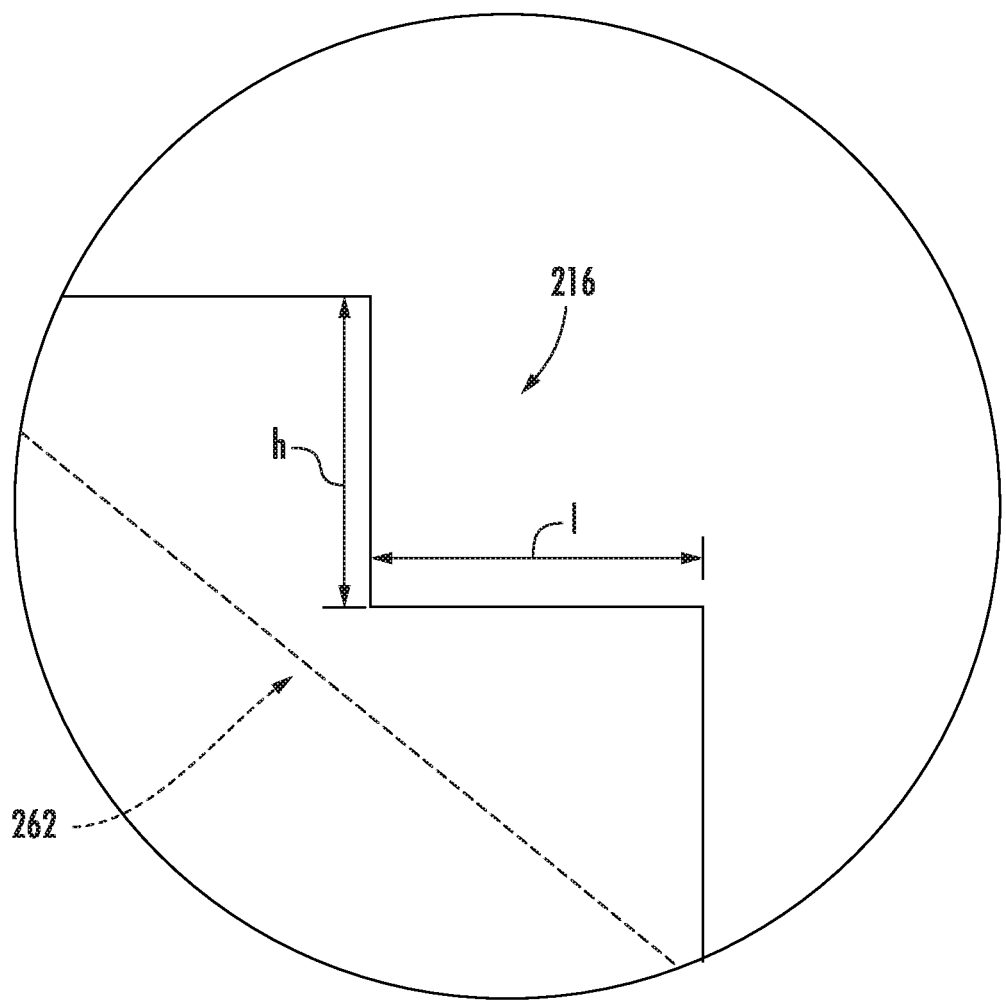
FIG. 13 illustrates another method of using the edge defect gauge of FIG. 9, according to one or more embodiments shown and described herein.

A separated edge 260 of the glass sheet 252 having a cantilever chip 262 recessed inward is aligned with the end edge 204 of the edge defect gauge 200. The cantilever chip 262 extends inward from the separated edge 260 and under the cantilever measuring recess 216. In this example, the cantilever chip 262 is within the dimensions than the cantilever measuring recess 216 in both the height h and length l dimensions (i.e., the glass sheet 252 is visible within the cantilever measuring recess 216. Thus, the glass sheet 252 is a "go" and can continue to be used in a downstream process. FIG. 13 illustrates an example where the cantilever chip 262 is outside the height h and length l dimensions. Thus, glass sheet 270 is a "no go" and is thrown out (e.g., recycled) as waste.

In some embodiments, the glass sheets described herein have a thickness in a range from 0.2 mm to 4 mm, 0.2 mm to 3 mm, 0.2 mm to 2 mm, 0.2 mm to 1.5 mm, 0.2 mm to 1 mm, 0.2 mm to 0.9 mm, 0.2 mm to 0.8 mm, 0.2 mm to 0.7 mm, 0.2 mm to 0.6 mm, 0.2 mm to 0.5 mm, 0.3 mm to 4 mm, 0.3 mm to 3 mm, 0.3 mm to 2 mm, 0.3 mm to 1.5 mm, 0.3 mm to 1 mm, 0.3 mm to 0.9 mm, 0.3 mm to 0.8 mm, 0.3 mm to 0.7 mm, 0.3 mm to 0.6 mm, 0.3 mm to 0.5 mm, 0.4 mm to 4 mm, 0.4 mm to 3 mm, 0.4 mm to 2 mm, 0.4 mm to 1.5 mm, 0.4 mm to 1 mm, 0.4 mm to 0.9 mm, 0.4 mm to 0.8 mm, 0.4 mm to 0.7 mm, 0.4 mm to 0.6 mm, 0.5 mm to 4 mm, 0.5 mm to 3 mm, 0.5 mm to 2 mm, 0.5 mm to 1.5 mm, 0.5 mm to 1 mm, 0.5 mm to 0.9 mm, 0.5 mm to 0.8 mm, 0.5 mm to 0.7 mm, 0.8 mm to 4 mm, 0.8 mm to 3 mm, 0.8 mm to 2 mm, 0.8 mm to 1.5 mm, 0.8 mm to 1 mm, 1 mm to 2 mm, 1 mm to 1.5 mm, and all ranges and subranges therebetween. In some embodiments, the glass-ceramic article may be substantially planar and flat. In other embodiments, the glass-ceramic article may be shaped, for example it may have a 2D, 2.5D or 3D shape. In some embodiments, the glass-ceramic article may have a uniform thickness and in other embodiments, the glass-ceramic article may not have a uniform thickness.

In some embodiments, the glass-ceramic articles disclosed herein may be a laminate. In such embodiments, vitreous region(s) may be a glass layer and the inner region may be a glass-ceramic. The glass may be any suitable glass that is ion-exchangeable, for example a glass containing alkali metal ions. In such embodiments, the vitreous region(s) have a zero (0) area percentage of crystals. The glass and glass-ceramic layers may be laminated together through conventional means. In some embodiments, lamination can include fusing the layers together. In other embodiments, lamination excludes layers that are fused together. In some embodiments, the layers may be ion-exchanged first and then laminated. In other embodiments, the ion exchange may occur after lamination.

The above-described edge defect gauges are used to measure edge defects of glass sheets where edge strips have been removed in a "go-no go" type fashion. The edge defect gauges are used to reduce thickness variability in the glass sheets for stacking in downstream thermal processes. Due to the edge separation requiring a larger than typical force over a small area and thin, long edge strips being separated, yield losses can arise from defects at ends of the separated edge strip. The defects can be present as cantilever chips and/or "dog ear" defects. Both types of defects can lead to stacking and ceram issues in downstream processes.

It should be emphasized that the above-described embodiments of the present disclosure, particularly any "preferred" embodiments, are merely possible examples of implementations, merely set forth for a clear understanding of various principles of the disclosure. Many variations and modifications may be made to the above-described embodiments of the disclosure without departing substantially from the spirit and various principles of the disclosure. All such modifications and variations are intended to be included herein within the scope of this disclosure and the following claims.

The invention claimed is:

1. A method of measuring a size of edge defects of glass sheets using an edge defect gauge, the method comprising:
   placing a glass sheet that includes a dog ear defect on the edge defect gauge, the edge defect gauge comprising:
   a body including opposite end edges and opposite side edges that extend between the end edges forming a body, the body having opposite flat faces; and a dog ear measuring projection extending outward from one of the end edges at one of the side edges, the dog ear measuring projection having a predetermined height and a predetermined length;

aligning an edge of the glass sheet with one of the side edges of the body, the dog ear defect coextending with the edge of the glass sheet;

aligning an adjacent edge of the glass sheet with the one of the end edges such that the dog ear extends over the dog ear measuring projection; and determining if at least one of a height and length dimension of the dog ear defect is (i) greater than or (ii) less than or equal to at least one of the predetermined height and predetermined length of the dog ear measuring projection.

2. The method of claim 1, wherein the edge defect gauge further comprises a glass edge alignment feature having a guide surface that extends outward from one of the faces of the body, the method further comprising aligning the edge of the glass sheet with the guide surface.

3. The method of claim 2, wherein the step of placing the glass sheet comprises placing the glass sheet on the one of the faces of the body from which the guide surface extends.

4. The method of claim 1, further comprising identifying the glass sheet as scrap if at least one of the height and length dimensions of the dog ear defect is greater than at least one of the predetermined height and length dimensions of the dog ear measuring projection.

5. The method of claim 1, wherein the predetermined height and the predetermined length are a same dimension.

6. The method of claim 1, further comprising:
placing a glass sheet that includes a cantilever chip on a support surface, wherein the glass sheet that includes a cantilever chip is the same as the glass sheet that includes a dog ear defect of a different glass sheet;

placing the edge defect gauge on the glass sheet with the cantilever chip with one of the faces of the body facing the glass sheet, the edge defect gauge comprising:
a cantilever measuring recess extending inward from the other end edge at the one of the side edges, the cantilever measuring recess having a predetermined height and a predetermined length;

aligning an edge of the glass sheet with the cantilever chip with the one of the side edges of the body, the cantilever chip located at the edge of the glass sheet;

aligning an adjacent edge of the glass sheet with the other end edge; and determining if the glass sheet with the cantilever chip is visible within the cantilever measuring recess.

7. The method of claim 6, wherein the edge defect gauge further comprises a glass edge alignment feature having a guide surface that extends outward from the one of the faces of the body, the method further comprising aligning the edge of the glass sheet with the cantilever chip with the guide surface.

8. The method of claim 6, further comprising identifying the glass sheet as scrap if the glass sheet is not visible within the cantilever measuring recess.

9. The method of claim 6, wherein the predetermined height and the predetermined length of the cantilever measuring recess are a same dimension.

10. An edge defect gauge that measures a size of edge defects of glass sheets, the edge defect gauge comprising:
a body including opposite end edges and opposite side edges that extend between the end edges forming a body, the body having opposite flat faces; and at least one of (i) a dog ear measuring projection extending outward from one of the end edges at one of the side edges, the dog ear measuring projection having a predetermined height and a predetermined length or (ii) a cantilever measuring recess extending inward from the other end edge at the one of the side edges, the cantilever measuring recess having a predetermined height and a predetermined length.

11. The edge defect gauge of claim 10 further comprising a glass edge alignment feature having a guide surface that extends outward from one of the faces of the body.

12. The edge defect gauge of claim 11 formed from a single piece of material.

13. The edge defect gauge of claim 10, wherein the predetermined height and the predetermined length are a same dimension.

14. The edge defect gauge of claim 10, wherein the edge defect gauge includes the dog ear measuring projection and the cantilever measuring recess.

15. The edge defect gauge of claim 10, wherein the predetermined height and the predetermined length of the cantilever measuring recess are a same dimension.

16. A method of measuring a size of edge defects of glass sheets using an edge defect gauge, the method comprising:
placing a glass sheet that includes a cantilever chip on a support surface;

placing the edge defect gauge on the glass sheet, the edge defect gauge comprising:
a body including opposite end edges and opposite side edges that extend between the end edges forming a body, the body having opposite flat faces where one of the faces of the body facing the glass sheet; and a cantilever measuring recess extending inward from one of the end edges at one of the side edges, the cantilever measuring recess having a predetermined height and a predetermined length;

aligning an edge of the glass sheet with the one of the side edges of the body, the cantilever chip located at the edge of the glass sheet;

aligning an adjacent edge of the glass sheet with the one of the end edges; and determining if the glass sheet is visible within the cantilever measuring recess.

17. The method of claim 16, wherein the edge defect gauge further comprises a glass edge alignment feature having a guide surface that extends outward from the one of the faces of the body, the method further comprising aligning the edge of the glass sheet with the guide surface.

18. The method of claim 16, further comprising identifying the glass sheet as scrap if the glass sheet is not visible within the cantilever measuring recess.

19. The method of claim 16, wherein the predetermined height and the predetermined length of the cantilever measuring recess are a same dimension.

20. The method of claim 16, wherein the edge defect gauge further comprises a dog ear measuring projection extending outward from the other end edge at the one of the side edges, the dog ear measuring projection having a predetermined height and a predetermined length.

* * * * *